Patented July 11, 1933

UNITED STATES PATENT OFFICE

WILLIAM SMITH AND JOHN THOMAS, OF GRANGEMOUTH, SCOTLAND, ASSIGNORS TO SCOTTISH DYES, LIMITED, OF GRANGEMOUTH, SCOTLAND

COMPOUNDS OF THE AMINO-HALO-INDANTHRENE SERIES AND PROCESS OF MAKING THEM

No Drawing. Application filed November 21, 1929, Serial No. 408,924, and in Great Britain November 28, 1928.

The principal object of the invention is to provide new condensation products from halogenated indanthrones, or improved or modified processes for the production of condensation products from halogenated indanthrones.

As a result of researches, we have discovered that halogen atoms in the $\alpha$-positions in di-anthraquinone-1.2.2'.1'-dihydroazines (indanthrones) are reactive, so that they may be replaced by other groups, for example, by amino or hydroxy groups, or by substituted amino- or hydroxy-groups. These $\alpha$-halogen indanthrone products may be treated with amino-anthraquinone, ammonia, methylamine or aniline for the introduction of amino-, methyl-amino- or anilido-groups. They may also be treated with alcoholates or phenols for the production of hydroxy-, alkoxy- and similar derivatives.

The processes may be carried out in the presence of acid absorbing agents, and catalysts such as copper or copper compounds may be used. The reactions may be carried out with or without diluents or solvents.

When the indanthrones contain in addition halogen atoms in $\beta$-positions, these are not generally affected. The halogenated indanthrones can also be used in the azine form.

The invention consists in a process for the production of condensation products for halogenated indanthrones having halogenated atoms in the $\alpha$-position, according to which these atoms are replaced by other groups, for example, by amino or hydroxy groups, or by substituted amino- or hydroxy- groups.

The invention also consists in a process according to the preceding paragraph, in which the $\alpha$-halogen-indanthrones are treated with amino-anthraquinone ammonia, methylamine or aniline for the introduction of amino-, methylamino- or anilido-groups.

The invention also consists in a modification of the process according to the preceding paragraph, in which the $\alpha$-halogen indanthrone bodies are treated with alcoholates or phenols for the production of hydroxy-alkoxy and similar derivatives.

The invention also consists in a process according to any of the preceding three paragraphs in which the $\alpha$-halogen indanthrones contain halogen constituents in the 3:3'-positions.

The invention also consists in processes according to any of the preceding three paragraphs, in which one or more of the following features are employed, viz., (a) Acid absorbing agents are present: (The substances added as acid absorbers mentioned in the examples are:—sodium acetate, sodium carbonate and caustic potash. Where a base for example, monomethylamine or aniline is used, this also may function to some extent as an acid absorbing agent. When condensing with phenol the caustic potash used as acid absorbing agent is present in combined form as potassium phenate.)

(b) Catalysts such as copper or copper compounds are present: (The substances added as catalysts mentioned in the examples are copper acetate, finely divided copper, copper oxide, copper chloride and cuprous chloride.)

(c) The reactions are carried out with diluents or solvents or alternatively, the reactions are carried out without diluents or solvents. (The substance specifically mentioned in the examples as added as diluent or solvent is nitro-benzene. In addition when condensation is being effected with aniline or phenol an excess of this is employed to act as solvent or diluents. Such diluent is not necessarily inert for the reason explained in paragraph (a) above.)

The following examples illustrate how the invention may be carried into effect, references to parts and to percentages being to parts and percentages by weight:—

Example 1

8 parts of 3:3'-4:4'-tetrachlor indanthrone are added to 100 parts of aniline along with 5 parts of anhydrous sodium acetate and 2.5 parts of anhydrous copper acetate.

The temperature is then raised to about 170° C. and kept at 170–175° C. for several hours. The product is then allowed to cool, and filtered at 90° C. It forms a dark blue solid, which after pasting in sulphuric acid and pouring into water gives a dark blue paste, which dyes cotton from an alkaline hydrosulphite vat in blue-green shades of excellent fastness.

*Example 2*

10 parts of caustic potash are added to 100 parts of phenol, and the mixture heated until no water is driven off. 5 parts of 4-chlor-indanthrone are then added, and 0.1 part of finely divided copper, and the temperature taken to the boil and kept there for several hours. It is then allowed to cool partially, and a mixture of 50 parts of water and 50 parts of alcohol added. It is filtered, washed with aqueous alcohol and dried.

*Example 3*

2 parts of 3:3'4:4'-tetra-chlor-indanthrone, 2 parts of 1-amino-anthraquinone, 0.4 parts of copper oxide, 1.5 parts of sodium acetate and 20 parts of nitrobenzene are boiled together for several hours. The mixture is filtered, washed with nitrobenzene and methylated spirits and dried. Inorganic salts are removed by boiling with water, filtering, washing with water and drying. The product dyes cotton in deep bluish-green shades from an alkaline hydrosulphite vat.

*Example 4*

100 parts of phenol and 10 parts of caustic potash are heated at 180° C. until no more water is evolved. 5 parts of 4-brom-indanthrone are then added and 0.1 parts finely divided copper and the mixture then boiled for several hours. After allowing to cool to about 70° C. a mixture of 50 parts of water with 50 parts of alcohol is added and the product filtered off, washed with aqueous alcohol and dried. The dyestuff gives greenish-blue shades of cotton from an alkaline hydrosulphite vat.

*Example 5*

7.5 parts of 3:3'-4-trichlor indanthrone are boiled for 15 hours with 100 parts of aniline and 0.2 parts of copper chloride. After allowing to cool, the product is filtered off, washed with aniline and methylated spirits and dried. The dyestuffs gives bluish-green shades from an alkaline hydrosulphite vat.

*Example 6*

5 parts of 3:3'-4:4-tetra-chlor-indanthrone prepared for example by the method of Example 1 of British application No. 330,217 are boiled with 5 parts of 2-amino-anthraquinone, 4 parts of sodium carbonate, 0.1 parts of cuprous chloride and 100 parts of nitrobenzene with good stirring for about 15 hours. The mixture is then allowed to cool to 100° C., filtered, washed with warm nitrobenzene until free from 2-amino-anthraquinone and then with methylated spirit until free from nitrobenzene. The product is boiled with water, filtered, well washed with water and dried. The dyestuff can then be dissolved in 10 times it weight of sulphuric acid, precipitated in water, filtered and washed acid free. It dyes cotton in fast greyish-blue shades from a greenish vat.

*Example 7*

This is similar to Example 6 except that instead of 5 parts of the indanthrone body there mentioned there is used instead 5 parts of 3:3'-dibrom-4:4'-dichlor indanthrone prepared for example by the method of Example 3 of British application No. 330,217 and 1-amino-anthraquinone instead of 2-amino-anthraquinone.

The product obtained dyes cotton in deep greenish-grey to black shades from the vat.

*Example 8*

This is similar to Example 7 but 3:3'-4-trichlor-indanthrone, prepared for example by the method of Example 2 of British application No. 330,217 is used.

The product dyes cotton from an alkaline hydrosulphite vat in greenish-blue shades much bluer than those obtained according to Example 7.

*General*

The invention is not limited to the examples described above.

The process is of particular value with halogenated indanthrones (for example 3:3'-4:4'-tetrachlor indanthrone) obtained by the method described in co-pending British application No. 330,217, for instance by slowly chlorinating 3:3'-dichlor-indanthrone for the preparation of a body which appears to be a tetra halogen hydrochloride derivative and treating it with sulphuric acid for the preparation of an azine.

The following new aqueous bodies which may be prepared according to the present application are regarded as of importance, namely:—

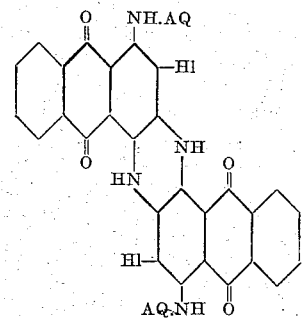

where AQ represents anthraquinone and Hl represents halogen.

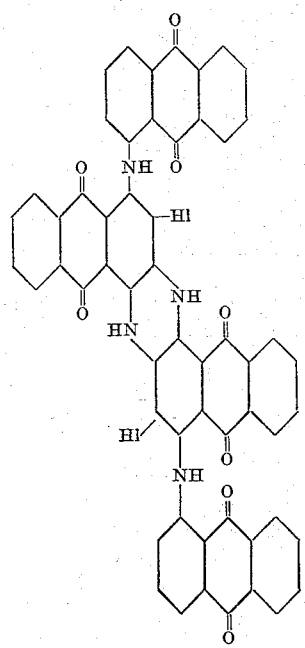

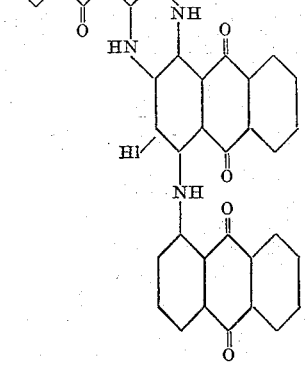

Having now described our invention, what we claim as new and desire to secure by Letters Patent is:—

1. A process for the production of condensation products which consists in heating together a halogenated indanthrone having a halogen atom in the α position with an acid absorbing agent and catalyst and a body chosen from the group consisting of ammonia and primary and secondary amines.

2. The process which consists in heating together a halogenated indanthrone having a halogen atom in the α position with an acid absorbing agent and catalyst and a substance chosen from the group consisting of 1-amino-anthraquinone methylamine and aniline.

3. A process as claimed in claim 1 in which the heating is carried out in the presence of a catalyst selected from the group consisting of copper and copper compounds.

4. A process as claimed in claim 1 in which the heating is carried out in the presence of a copper compound catalyst.

5. A process as claimed in claim 1 in which the heating is carried out in the presence of an inert diluent.

6. The compounds of which the structural formula is:—

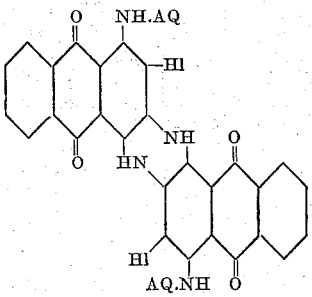

where AQ represents anthraquinone and Hl represents halogen.

7. The compounds of which the structural formula is:—

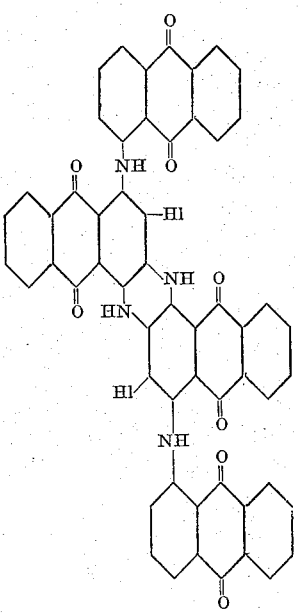

where Hl represents halogen.

8. The compound of which the structural formula is:

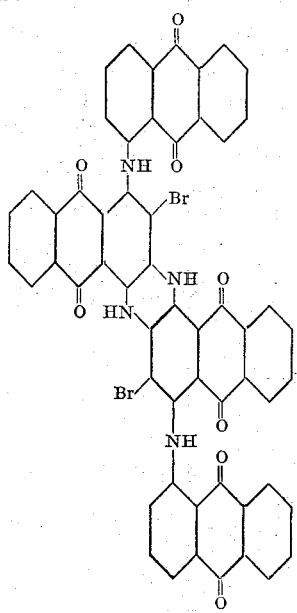

9. A process as claimed in claim 1 in which the heating is carried out in the presence of acid absorbing agents chosen from the group consisting of sodium acetate, sodium carbonate and caustic potash.

10. A process as claimed in claim 1 in which the heating is carried out in the presence of a catalyst chosen from the group consisting of copper acetate, finely divided copper, copper oxide, cupric chloride and cuprous chloride.

11. A process as claimed in claim 1 in which the heating is carried out in the presence of nitrobenzene.

In testimony whereof we have signed our names to this specification.

WILLIAM SMITH.
J. THOMAS.